(12) United States Patent
Espinosa Sanchez et al.

(10) Patent No.: US 10,006,578 B2
(45) Date of Patent: Jun. 26, 2018

(54) THREADED CONNECTION FOR DOUBLE-WALLED PIPES

(71) Applicants: Airbus Military, Getafe (ES); Airbus Operations S.L., Getafe (ES)

(72) Inventors: Martin Espinosa Sanchez, Getafe (ES); Antonio Verdugo Del Coto, Getafe (ES)

(73) Assignees: AIRBUS OPERATIONS S.L., Madrid (ES); AIRBUS MILITARY, Madrid (ES)

( * ) Notice: Subject to any disclaimer, the term of this patent is extended or adjusted under 35 U.S.C. 154(b) by 379 days.

(21) Appl. No.: 14/580,649

(22) Filed: Dec. 23, 2014

(65) Prior Publication Data
US 2015/0184781 A1   Jul. 2, 2015

(30) Foreign Application Priority Data
Dec. 27, 2013   (EP) ..................... 13382567

(51) Int. Cl.
*F16L 39/00*   (2006.01)
*F16L 41/00*   (2006.01)
*F16L 15/00*   (2006.01)

(52) U.S. Cl.
CPC .......... *F16L 39/005* (2013.01); *F16L 15/002* (2013.01); *F16L 15/003* (2013.01); *F16L 39/00* (2013.01); *F16L 41/008* (2013.01)

(58) Field of Classification Search
CPC ...... B64D 37/005; F16L 41/008; F16L 39/00; F16L 39/005; F16L 15/002; F16L 15/003; G01L 19/0007

(Continued)

(56) References Cited

U.S. PATENT DOCUMENTS

| | | | | |
|---|---|---|---|---|
| 1,976,817 A | * | 10/1934 | Walker | H02G 3/0616 174/482 |
| 2,689,102 A | * | 9/1954 | Whalen | F16L 41/008 248/230.5 |

(Continued)

FOREIGN PATENT DOCUMENTS

| | | | | |
|---|---|---|---|---|
| EP | 0829670 A2 | 3/1998 | | |
| EP | 1731822 A1 | 12/2006 | | |
| WO | WO 2007096548 A2 | * | 8/2007 | F16L 9/18 |

OTHER PUBLICATIONS

Extended European Search Report issued in EP 13382567.9, dated Jun. 6, 2014.

*Primary Examiner* — David Bochna
*Assistant Examiner* — James A Linford
(74) *Attorney, Agent, or Firm* — Greer Burns & Crain, Ltd

(57) ABSTRACT

A threaded connection for double-walled pipes, including an outer pipe, an inner pipe including an outward projection having a threaded conical end, a component connector having a threaded conical end threaded with the outward projection threaded conical end to provide a first threaded connection. The connector having an annular groove and a sealing ring. The threaded connection additionally including an intermediate piece with an inner threaded surface threaded with an outward projection outer threaded surface to provide a second threaded connection configured to turn in an opposite direction with respect to the first threaded connection. The intermediate piece also having a pressing surface that presses the sealing ring against the connector, and a sliding joint engaged with an outer pipe outward projection.

20 Claims, 1 Drawing Sheet

(58) Field of Classification Search
USPC ...... 285/904, 211, 212, 93, 123.3, 189, 219, 285/220
See application file for complete search history.

(56) References Cited

U.S. PATENT DOCUMENTS

| | | | | |
|---|---|---|---|---|
| 3,760,842 | A * | 9/1973 | Mikiya | ................... F16L 39/00 137/557 |
| 4,667,505 | A * | 5/1987 | Sharp | ................... F16L 21/002 138/104 |
| 5,127,679 | A | 7/1992 | Pouplier | |
| 6,116,658 | A * | 9/2000 | Bohlen | ................ F16L 19/005 285/330 |
| 6,553,842 | B1 * | 4/2003 | Tebeau | ................ G01L 19/0007 73/756 |
| 2004/0026922 | A1 * | 2/2004 | Carns | ................... F16L 39/005 285/123.15 |
| 2006/0157975 | A1 | 7/2006 | Fujii et al. | |

\* cited by examiner

US 10,006,578 B2

THREADED CONNECTION FOR DOUBLE-WALLED PIPES

CROSS-REFERENCE TO RELATED APPLICATION

This application claims the benefit of the European Patent Application No. 13382567.9 filed on Dec. 27, 2013, the entire disclosure of which is hereby incorporated herein by reference.

BACKGROUND OF THE INVENTION

The present invention refers to a threaded connection for connecting components to pipes, and more particularly, for connecting those components which are tapped on double-walled pipes.

One object of the present invention is to provide a threaded connection with a redundant barrier, in order to ensure the sealing of the connection such that no leakage is spilled from the pipe.

Another object of this invention is to provide a threaded connection suitable for being used in aircraft fuel installations which comprise fuel pipes designed as double-walled pipes for running along pressurized areas.

Another object of this invention is to provide a simplified threaded connection with a reduced number of components, entailing a weight reduction and an easiest installation. The threaded connection additionally achieves simplified maintenance.

There are already known threaded connections that provide sealing after their threading through different sealing arrangements. Typical sealing arrangements are provided by means of sealing rings, such as O-rings, or by complementary surfaces that perfectly fit each other avoiding the pass of fluid.

European Patent Application EP0829670A2 discloses an exemplary use of O-rings to provide sealing. That Application describes a hose coupler that attaches in a manner that provides a sealed conduit for preventing bacteria or other contaminants being present at the coupler connection. That Application describes a hollow female coupler piece connected with a hollow male coupler piece through an intermediate connector piece, wherein the coupler also includes means for sealing. This means for sealing includes an O-ring compressed by a shoulder of the male coupler against one or both of the intermediate and the second end of the female coupler piece when the male coupler piece is threadedly interconnected to the female coupler piece via the intermediate connector. So, either the second end of the female coupler piece, the intermediate piece or a combination thereof includes an annular groove defined therein to receive the O-ring. However, that Application does not provide a connection with a redundant barrier.

U.S. Pat. No. 5,127,679A discloses an exemplary use of complementary surfaces to provide sealing. That patent describes a fluid-tight connector that comprises two members with respectively concave and convex co-operating mating ends, joined together by an internally threaded sleeve retaining one of the members and tightened by being screwed onto the other part. By this configuration, the connector defines a conical contact surface that matches perfectly acting as a barrier for fluid loss. Again, that patent does not provide a connection with a redundant barrier.

In aeronautical field there also exists the need of providing a threaded connection with a redundant barrier. As known, aircraft fuel installations must comprise double-walled fuel pipes for running along pressurized areas. Conventionally, each double-walled fuel pipe comprises an outer pipe covering an inner pipe that conveys the fuel in order to ensure that no leakage from the inner pipe will be spilled.

Currently, to fulfill with international airworthiness regulations, components fixed on double-walled pipes by tapping on them must ensure a redundant barrier on the connection.

Installing components, such as pressure or temperature sensors, tapped on an inner pipe, requires a special interface on the component which complicates the connection at the time that demands certain space for its installation or accommodation in the connection.

To comply with the double barrier requirement in this type of connections, it becomes necessary to purchase dedicated components, usually not standardized, equipped with a tedious system of flanges, rings and bolted connections, which increases the time required for fixing components and the weight of the resulting connection.

Another solution consists of giving up the compliance of the double barrier requirement just on the connection. However, this solution is not acceptable in most of the cases, and especially as a permanent solution.

FIG. 1 shows a longitudinal section of a prior art sensing element 27 connected to the inner pipe 29 of a conventional double-walled pipe, such double-walled pipe is formed by an inner pipe 29 shrouded by an outer pipe 28. In the embodiment of the figure, the element connection 30 is directly threaded to the inner pipe 29, providing only one barrier 31 for sealing the connection. The arrows depicted in the figure show potential paths for fluid leaking so that, just providing one single barrier, other paths for fluid are let unsealed.

Considering FIG. 1, an option for providing a redundant barrier could consist of including sealing interfaces 32, 33 in the sensing element 27, therefore the redundant barrier requirement would be fulfilled. However, the connection of the sensing element would require several bolts and nuts, adding weight, making the installation more complex and taking up more room for the connection.

Therefore, it has been detected in this technical field the need for a threaded connection that provides redundant sealing barriers, especially needed in the aeronautical industry to fulfill with the international airworthiness regulations. It is also needed that the threaded connection provides a reduced number of components, simplifying the connection at the same time that achieves a reduction in weight.

SUMMARY OF THE INVENTION

The present invention overcomes the drawbacks above mentioned by providing a threaded connection with a redundant barrier that accomplishes a reduction of the complexity of the connection, facilitating its installation and minimizing the number of pieces involved for the double sealing barrier. Additionally, the threaded connection complies with the international airworthiness regulations since it ensures the compliance of the redundant barrier requirement on the connection.

An aspect of the invention refers to a threaded connection for double-walled pipes, wherein the threaded connection comprises:

an outer pipe comprising an outward projection,
an inner pipe surrounded by the outer pipe, the inner pipe comprising an outward projection having an inner surface with a threaded conical end; wherein the outward projection has an outer threaded surface and, wherein the threaded conical end of the outward projection has a flared connection that mates with a flared connection provided at the threaded conical end of the connector, a component connector having a threaded conical end threaded with the threaded conical end of the outward projection to provide a first threaded connection; the connector having an annular groove and a sealing ring received in the groove, a cylindrical intermediate piece with an inner threaded surface threaded with the outward projection outer threaded surface to provide a second threaded connection; the intermediate piece having a pressing surface at one end and a sliding joint at the other end, the pressing surface pressing the sealing ring against the connector, and the sliding joint engaged with an inner wall of the outer pipe outward projection.

Additionally, the first threaded connection and the second threaded connection are configured to turn in opposite directions.

In this way, the threaded conical end of the connector acts as a pin member of the first threaded connection and, the threaded conical end of the outward projection acts as a box member for said pin member. Likewise, the inner threaded surface of the intermediate piece acts as a pin member of the second threaded connection and, the outer threaded surface of the outward projection acts as a box member of said second threaded connection. Such that, the sense of rotation of the pin member of the first threaded connection is opposite to the sense of rotation of the pin member of the second threaded connection.

The invention provides a redundant barrier on the connection. The first barrier is provided by the flared connection of the threaded conical end of the outward projection, which mates with the flared connection provided at the threaded conical end of the connector. Both flared connections are threaded by threading the threaded conical end of the outward projection with the correspondent threaded conical end of the connector. The second barrier is provided by the sealing ring accommodated in the annular groove of the connector.

The first barrier is achieved by the flared connections of the two threaded conical ends, the one provided in the outward projection of the inner pipe and the other one in the connector, whereas the second barrier is achieved by the pressing surface provided in the intermediate piece. The pressure exerted by the pressing surface is ensured by the two threaded connections, the first threaded connection between an inner surface of the outward projection of the inner pipe and the connector, and the second threaded connection between an outer surface of the outward projection and the intermediate piece. Thus, the invention provides a redundant barrier on the connection with the addition of only one piece, the intermediate piece, and with a connector which may be standard.

Additionally, since the invention provides a threaded connection for double-walled pipes, the connection is suitable for being used in pipes employed in aircraft fuel installations, and especially, for those fuel pipes which extend along pressurized areas of the aircraft, since those pipes have to be double-walled type pipes. Therefore, since the threaded connection provides a redundant barrier on double-walled pipes, the threaded connection of the invention fulfils with current international airworthiness regulations.

Moreover, the threaded connection offers an improved sealing connection since, with the double barrier, the risk of leakage is sharply reduced.

In addition, the invention provides an improved connection due to the special configuration provided to the inner pipe outward projection and to the intermediate piece. On one hand, the intermediate piece allows for providing the second sealing barrier and, on the other hand, allows for reducing the number of pieces involved in the connection, resulting in a simplified connection, both in terms of installation and maintenance.

Additionally, the invention provides a compact solution since the connection no longer requires bolted flanges, nuts, bolts or any other ancillary piece conventionally needed for the connection. In this way, the invention achieves a reduction in the space typically required for this type of connections. In addition, the invention achieves a reduction in weight as a result of reducing the number of pieces employed, since the weight added by the intermediate piece compensates the weight saved due to the ancillary pieces avoided.

BRIEF DESCRIPTION OF THE DRAWINGS

For a better comprehension of the invention the following drawings are provided for illustrative and non-limiting purposes, wherein.

DETAILED DESCRIPTION OF THE PREFERRED EMBODIMENTS

Figure 1:
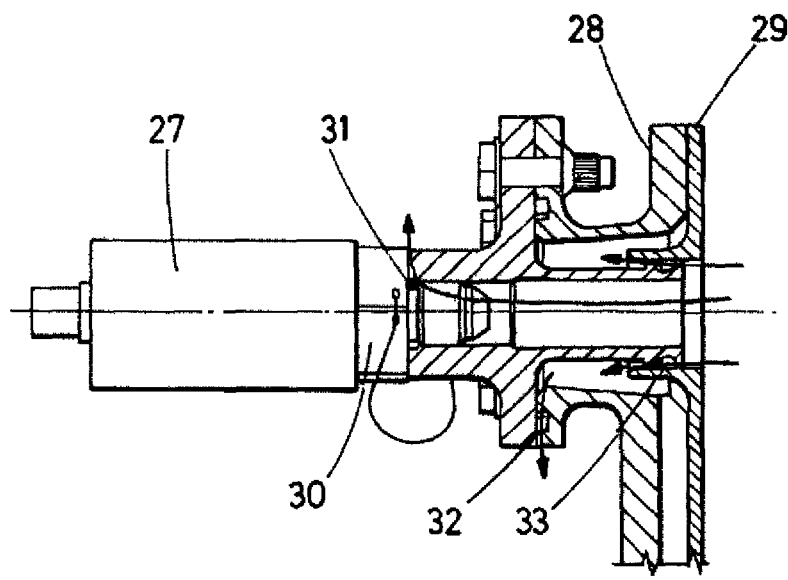
FIG. 1 shows a longitudinal section of a prior art element connection.
Figure 2:
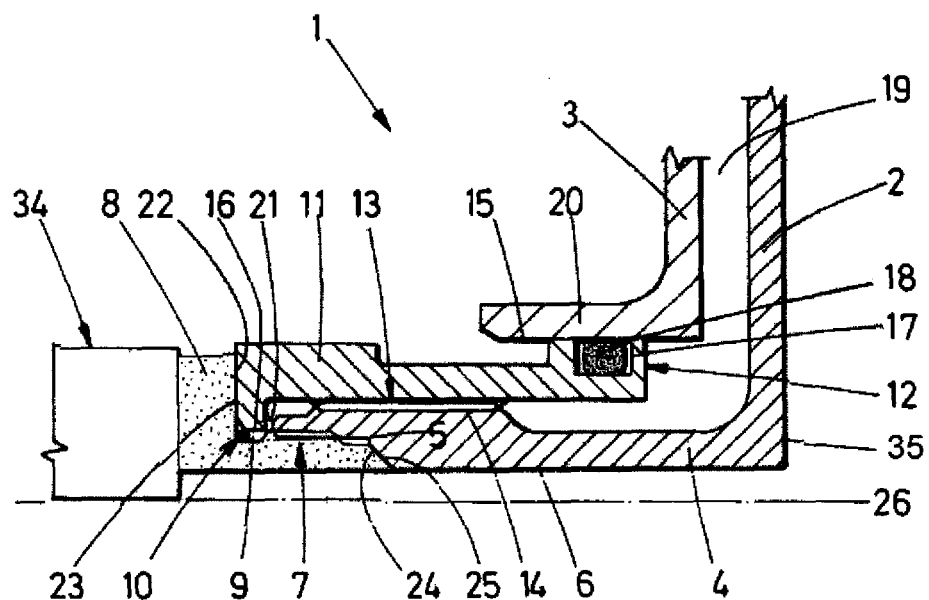
FIG. 2 shows the upper half of a longitudinal section of the threaded connection according to a preferred embodiment.

FIG. 2 shows an exemplary embodiment of a threaded connection 1 for a double-walled pipe end, which also might be located on a chamber at a double-walled installation or on a double-walled pipe end. Preferentially, the doubled-walled pipe comprises an outer pipe 3 and an inner pipe 2 surrounded by the outer pipe 3, wherein both pipes 2, 3 are in spaced relation defining a passage 19 between them. The inner pipe 2 conveys a fluid that contacts with the inner surface 35 of the inner pipe 2 and with the inner surface 6 of the outward projection 4 of the inner pipe 2, since the fluid conveyed by the inner pipe 2 enters in the projection to be in direct contact with a component 34. This component 34 could be a pressure sensor or a temperature sensor, so that any of these measures could be obtained through the threaded connection 1.

The outward projection 4 of the inner pipe 2 is threaded at its both surfaces to ensure its connection with a component connector 8 and with a cylindrical intermediate piece 11. The connector 8 is connected to the component 34 and the intermediate piece 11 is, at one end, in contact with the connector 8 and, at the other end, in contact with the outer pipe 3.

The outward projection 4 comprises an inner surface 6 with a threaded conical end 5 threaded with a threaded conical end 7 of the connector 8. This threading provides the first threaded connection to the threaded connection 1 of the invention. Also, threading the two conical ends 5, 7, the threaded connection 1 provides the first sealing barrier, so that through to the threading, both the flared connection 25 provided at the threaded conical end 5 of the outward projection 4 and the flared connection 24 of the threaded conical end 7 of the connector (8), are maintained and the barrier is ensured.

In a preferred embodiment, the flared connection 23 of the outward projection 4 is provided at the innermost section of the threaded conical end 5 of the outward projection 4. And preferably, the threaded conical end 5 of the outward projection 4 comprises two sections of different diameter. In another preferred embodiment, the connector 8 is a SAE AS4395 Style E or a SAE AS5202, in this case, the connector 8 is provided with a standard threaded flared connection at one of its ends to perfectly mate with the threaded and flared connection of the end of the outward projection.

The outward projection 4 of the threaded connection 1 additionally comprises an outer threaded surface 14 threaded with an inner threaded surface 13 of the intermediate piece 11. By threading the two threaded surfaces 13, 14, the threaded connection 1 provides a second threaded connection.

In the threaded connection 1 of the invention, the first threaded connection and the second threaded connection are configured to turn in opposite directions. In a preferred embodiment, the first threaded connection is a right-handed threaded and the second threaded connection is a left-handed threaded, however, opposite directions is also possible for the first and second threaded connections. Thus, the first threaded connection and the second threaded connection comprise threads in opposite directions. The fact that the first and second threaded connections have opposite threads provides an additional advantage to the invention, ensuring and enhancing the tightening of the connection.

The intermediate piece 11 has a pressing surface 16 at one end, preferably a chamfer surface, and a sliding joint 12 at the other end. The pressing surface 16 presses the sealing ring 10, received in the annular groove 9 of the connector 8, against the connector 8, and the sliding joint 12 is engaged with an inner wall 15 of the outer pipe 3 outward projection 20.

The threaded connection 1 achieves a second sealing barrier by pressing the sealing ring 10 accommodated in the groove 9 of the connector 8, wherein said pressure is achieved by the pressing surface 16 provided at the intermediate piece 11.

Preferably, the pressing surface 16 is separated by a gap 21 with the outward projection 4, so that this gap 21 separation allows the inclusion of the intermediate piece 11 in the threaded connection 1 of the invention.

In another preferred embodiment, the intermediate piece 11 has a surface 22 in contact with a surface 23 of the connector 8, wherein both surfaces 22, 23 are orthogonal to axis 26 defined by outward projection 4. Preferably, as shown in FIG. 2, the contact surface 22 of the intermediate piece 11 is contiguous to the pressing surface 16.

In another preferred embodiment, the sliding joint 12 comprises an annular groove 17 containing a seal ring 18 at an outer part of the intermediate piece 11 end.

In another preferred embodiment, the threaded conical end 7 of the connector 8 is provided with longitudinal notches. According to another preferred embodiment, the inner threaded surface 13 of the intermediate piece 11 is provided with longitudinal notches. In this way and according to another preferred embodiment, the passage 19 defined by the spaced relation between the outer pipe 3 and the inner pipe 2 receives the outflow of the notches. So, the threaded connection 1 of the invention provides an additional advantage since the notches accomplish good paths for the fluid, driving said fluid to the outer pipe 3 and facilitating the detection of any leakage in the flared connection. Therefore, the threaded connection 1 provides an additional advantage since comprising notches that facilitate the leakage detection in the connection.

Alternatively and according to another preferential embodiment, the threaded connection may comprise a pipe with an outer and an inner wall, the outer wall acting as the outer pipe 3, and the inner wall, acting as the inner pipe 2. Likewise, according to another preferential embodiment, the threaded connection may comprise and outer chamber and an inner chamber, the outer chamber acting as the outer pipe 3, and the inner chamber, acting as the inner pipe 2.

The invention claimed is:

1. A threaded connection for double-walled pipes, the threaded connection comprising:
   an outer pipe comprising an outward projection,
   an inner pipe surrounded by the outer pipe, the inner pipe comprising an outward projection having an inner surface with a threaded conical end,
   a component connector having a threaded conical end threaded with respect to the threaded conical end of the inner pipe to provide a first threaded connection, the component connector having an annular groove and a sealing ring received in the groove,
   wherein the outward projection of the inner pipe has an outer threaded surface, and
   wherein the threaded conical end of the outward projection of the inner pipe has a flared connection that mates with a flared connection provided at the threaded conical end of the component connector, and
   further wherein the threaded connection comprises:
   a cylindrical intermediate piece with an inner threaded surface threaded with respect to the outer threaded surface of the inner pipe to provide a second threaded connection,
   the intermediate piece having a pressing surface at one end and a sliding joint at the other end,
   the pressing surface pressing the sealing ring against the component connector,
   the sliding joint engaged with an inner wall of the outward projection of the outer pipe, and
   wherein the first threaded connection and the second threaded connection are configured to turn in opposite directions.

2. The threaded connection according to claim 1, wherein the sliding joint comprises an annular groove containing a seal ring at an outer part of the intermediate piece end.

3. The threaded connection according to claim 2, wherein the pressing surface is separated by a gap with the outward projection of the inner pipe.

4. The threaded connection according to claim 2, wherein the intermediate piece has a surface in contact with a surface of the component connector, and both surfaces are orthogonal to an axis defined by the outward projection of the inner pipe.

5. The threaded connection according to claim 2, wherein the threaded conical end of the component connector is provided with longitudinal notches.

6. The threaded connection according to claim 2, wherein the inner threaded surface of the intermediate piece is provided with longitudinal notches.

7. The threaded connection according to claim 2, wherein the first threaded connection is right-handed threaded and the second threaded connection is left-handed threaded.

8. The threaded connection according to claim 2, wherein the flared connection of the outward projection of the inner pipe is provided at the innermost section of the threaded conical end of the outward projection of the inner pipe.

9. The threaded connection according to claim 2, wherein the threaded conical end of the outward projection of the inner pipe comprises two sections of different diameter.

10. The threaded connection according to claim 2, wherein the component connector is an SAE AS4395 Style E or an SAE AS5202.

11. The threaded connection according to claim 1, wherein the pressing surface is separated by a gap with the outward projection of the inner pipe.

12. The threaded connection according to claim 1, wherein the intermediate piece has a surface in contact with a surface of the component connector, and both surfaces are orthogonal to an axis defined by the outward projection of the inner pipe.

13. The threaded connection according to claim 1, wherein the threaded conical end of the component connector is provided with longitudinal notches.

14. The threaded connection according to claim 13, wherein the outer pipe is in spaced relation to the inner pipe defining a passage that receives the outflow of the notches.

15. The threaded connection according to claim 1, wherein the inner threaded surface of the intermediate piece is provided with longitudinal notches.

16. The threaded connection according to claim 15, wherein the outer pipe is in spaced relation to the inner pipe defining a passage that receives the outflow of the notches.

17. The threaded connection according to claim 1, wherein the first threaded connection is right-handed threaded and the second threaded connection is left-handed threaded.

18. The threaded connection according to claim 1, wherein the flared connection of the outward projection of the inner pipe is provided at the innermost section of the threaded conical end of the outward projection of the inner pipe.

19. The threaded connection according to claim 1, wherein the threaded conical end of the outward projection of the inner pipe comprises two sections of different diameter.

20. The threaded connection according to claim 1, wherein the component connector is an SAE AS4395 Style E or an SAE AS5202.

* * * * *